(12) United States Patent
Heverly, II et al.

(10) Patent No.: US 10,814,963 B2
(45) Date of Patent: Oct. 27, 2020

(54) ACTIVE VIBRATION CONTROL SYSTEM WITH NON-CONCENTRIC REVOLVING MASSES

(71) Applicant: Bell Helicopter Textron Inc., Fort Worth, TX (US)

(72) Inventors: David E. Heverly, II, Arlington, TX (US); Jeremy DeWaters, Hummelstown, PA (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 190 days.

(21) Appl. No.: 16/054,606

(22) Filed: Aug. 3, 2018

(65) Prior Publication Data

US 2018/0370621 A1 Dec. 27, 2018

Related U.S. Application Data

(63) Continuation of application No. 14/600,180, filed on Jan. 20, 2015, now Pat. No. 10,065,730.
(Continued)

(51) Int. Cl.
*B64C 27/00* (2006.01)
*B64C 29/00* (2006.01)

(52) U.S. Cl.
CPC ........ *B64C 27/001* (2013.01); *B64C 29/0033* (2013.01); *B64C 2027/003* (2013.01)

(58) Field of Classification Search
CPC .............. B64C 27/001; B64C 29/0033; B64C 2027/003
See application file for complete search history.

(56) References Cited

U.S. PATENT DOCUMENTS 2,353,492 A 7/1944 O'Connor
2,425,650 A 8/1947 Stalker
(Continued)

FOREIGN PATENT DOCUMENTS

GB 1120193 A 7/1968

OTHER PUBLICATIONS

U.S. Appl No. 13/933,888, filed Jul. 2, 2013, having inventors David A. Popelka and Frank B. Stamps.
(Continued)

*Primary Examiner* — Thomas E Worden
(74) *Attorney, Agent, or Firm* — Timmer Law Group, PLLC

(57) ABSTRACT

A vibration control system for a rotor hub provides vibration attenuation in an aircraft by reducing the magnitude of rotor induced vibratory. The system can include a force generating device attached to a rotor hub which rotates along with the rotor at the rotational speed of the rotor. Vibratory shear force is generated by rotating unbalanced weights each about an axis non-concentric with the rotor hub axis at high speed to create large centrifugal forces. The rotational speed of the weights can be a multiple of the rotor rotational speed to create shear forces for canceling rotor induced vibrations. The amplitude of the generated shear force is controlled by indexing the positions of the unbalanced weights relative to each other, while the phase of the shear force is adjusted by equally phasing each weight relative to the rotor.

3 Claims, 8 Drawing Sheets

Related U.S. Application Data

(60) Provisional application No. 61/930,004, filed on Jan. 22, 2014.

(56) References Cited

U.S. PATENT DOCUMENTS

| | | | |
|---|---|---|---|
| 2,951,581 A | 9/1960 | Long | |
| 3,208,292 A | 9/1965 | Austin | |
| 3,219,120 A | 11/1965 | Hooper | |
| 3,617,020 A | 11/1971 | Gerstine | |
| 3,910,720 A | 10/1975 | Vincent | |
| 4,255,084 A | 3/1981 | Mouille et al. | |
| 5,005,439 A * | 4/1991 | Jensen | F16F 15/22 248/550 |
| 5,639,214 A | 6/1997 | Guimbal | |
| 5,825,663 A | 10/1998 | Barba et al. | |
| 5,934,424 A | 8/1999 | Hosek | |
| 6,045,090 A | 4/2000 | Krysinksy et al. | |
| 6,139,271 A | 10/2000 | Chadwick | |
| 6,212,445 B1 | 4/2001 | Barba et al. | |
| 8,021,115 B2 | 9/2011 | Welsh | |
| 8,196,856 B2 | 6/2012 | Wilson | |
| 10,065,730 B2 | 9/2018 | Heverly, II et al. | |
| 2005/0079056 A1 | 4/2005 | Welsh | |
| 2006/0083617 A1 | 4/2006 | Jolly et al. | |
| 2008/0206051 A1 | 8/2008 | Wakasa | |
| 2009/0254230 A1 | 10/2009 | Jolly | |
| 2010/0034655 A1 | 2/2010 | Jolly | |
| 2011/0027081 A1 | 2/2011 | Jolly | |
| 2011/0155841 A1 | 6/2011 | Cranga | |
| 2015/0353191 A1 | 12/2015 | Jolly | |
| 2015/0370266 A1 | 12/2015 | Norris | |
| 2016/0195161 A1 * | 7/2016 | Hunter | F16F 7/1005 74/570.1 |

OTHER PUBLICATIONS

U.S. Appl No. 14/231,940, filed Apr. 1, 2014, having inventors David Heverly, David A. Popelka and Frank B. Stamps.

Office Action, dated Jun. 22, 2016, by the USPTO, re U.S. Appl. No. 14/600,180.

Final Rejection, dated Nov. 10, 2016, by the USPTO, re U.S. Appl. No. 14/600,180.

Advisory Action, dated Dec. 23, 2016, by the USPTO, re U.S. Appl. No. 14/600,180.

Office Action, dated Jun. 7, 2017, by the USPTO, re U.S. Appl. No. 14/600,180.

Final Rejection, dated Oct. 13, 2017, by the USPTO, re U.S. Appl. No. 14/600,180.

Advisory Action, dated Jan. 11, 2018, by the USPTO, re U.S. Appl. No. 14/600,180.

Notice of Allowance, dated May 31, 2018, by the USPTO, re U.S. Appl. No. 14/600,180.

* cited by examiner

ACTIVE VIBRATION CONTROL SYSTEM WITH NON-CONCENTRIC REVOLVING MASSES

CROSS-REFERENCE TO RELATED APPLICATIONS

This application is a continuation of U.S. patent application Ser. No. 14/600,180, filed Jan. 20, 2015, which claims priority to U.S. provisional application No. 61/930,004, filed Jan. 22, 2014, the disclosures of which are hereby incorporated by references for all purposes as if fully set forth herein.

BACKGROUND

Technical Field

The present disclosure relates to vibration attenuation for rotor hubs.

Description of Related Art

Rotary-wing aircraft, such as helicopters and tiltrotors, have at least one rotor for providing lift and propulsion forces, and these rotors have at least two airfoil blades connected to a rotatable hub. The blades cause vibrations that are a function of the rotational speed of the rotor, and aircraft designers have difficulty accurately predicting the exact vibration modes that a particular rotor configuration will encounter. The vibrations can be transmitted through the rotor hub, through the rotor mast, through associated powertrain components, and into the airframe of the aircraft. The vibrations can reduce the life of affected components and cause undesirable vibration for passengers. Various types of vibration attenuation systems have been developed to reduce or eliminate these vibrations. The prior art includes both passive and active devices that are airframe-mounted, mounted at the interface between the airframe and the rotor system, and devices mounted in the rotor system.

Conventionally, active control of helicopter vibration has been by one of three methods; installing force generating actuators onto the airframe, or installing actuation devices between the main rotor pylon assembly and the airframe, or installing actuation devices in the main rotor system. Active vibration control systems, for rotorcraft applications, are closed loop control systems designed to suppress vibrations at harmonics of the main rotor frequency. Typically, a rotorcraft active vibration control system is comprised of vibration sensors; a control computer to process the vibration measurements and output control commands to an actuation device; and actuation devices to produce force inputs to the rotorcraft airframe, or at the pylon-airframe interface, or actuation inputs to the rotor hub, or actuation inputs to the rotor blades. Vibration reduction is achieved by superposition of the vibrations created by the active system's actuation forces, and the vibrations caused by the rotorcraft main rotor system.

Active vibration control systems have been proposed that are mounted to the main rotor hub and apply control forces to the main rotor hub. These types of systems propose two or more pairs of masses revolving about and concentric with the center of the main rotor mast to create a controllable force to cancel the rotor generated forces.

Although great strides have been made in the art of vibration attenuators for rotorcraft, there is an on-going need for vibration suppression devices and methods that are more effective, require less weight, require less power, and have less severe failure modes.

DESCRIPTION OF THE DRAWINGS

The novel features believed characteristic of the system and method of the present disclosure are set forth in the appended claims. However, the system and method itself, as well as a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
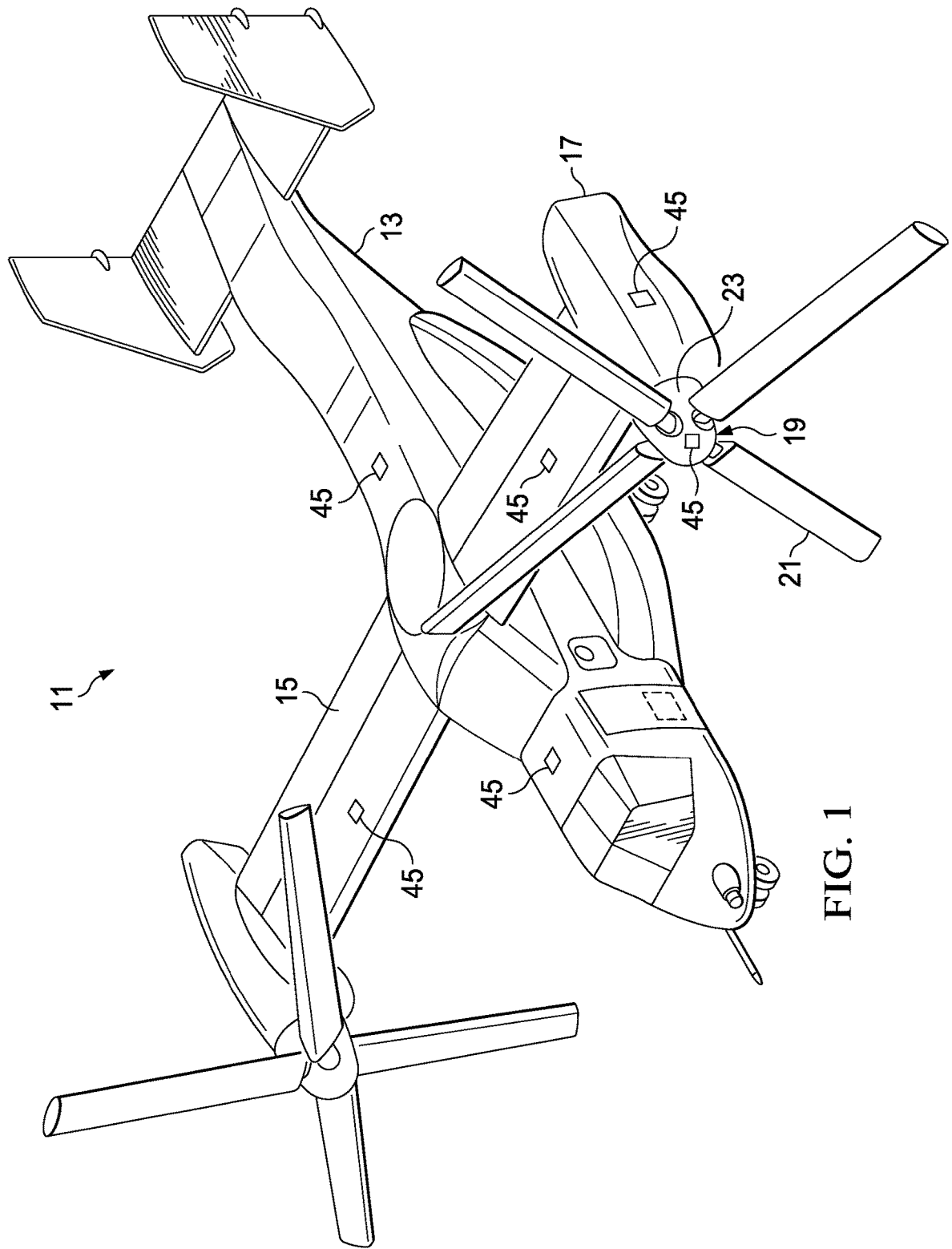
FIG. 1 is an oblique view of an aircraft having an active vibration control system, according to one example embodiment.

Illustrative embodiments of the system and method of the present disclosure are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

An active vibration control system for a rotor hub provides vibration attenuation in a rotary-wing aircraft by reducing the magnitude of rotor induced vibratory forces acting on the airframe. The active vibration control system includes a force generating device attached to a rotor hub and rotates along with the rotor at the rotational speed of the rotor. Within the force generating device, vibratory shear force is generated by rotating pairs of unbalanced weights at high speed to create large centrifugal forces, and the unbalanced weights may be driven by electric motors or by torque provided by the rotor mast. The rotational speed of the unbalanced weights will typically be a multiple of the rotor rotational speed to create shear forces for canceling rotor induced vibrations, which can be rotating in the same direction as the rotor or in the opposite direction. The amplitude of the generated shear force is controlled by indexing the positions of the unbalanced weights relative to each other, while the phase of the shear force is adjusted by equally phasing each unbalanced weight relative to the rotor. A microprocessor-based control system uses feedback from vibration sensors to command the operation of the unbalanced weights so as to minimize vibrations transmitted to the airframe.

This system is an improvement over methods now being used because it is lighter weight, more compact, and is capable of better vibration reduction. The principal advantage of this device is that it cancels the source of vibratory loads, thereby reducing vibration throughout the entire aircraft. By reducing the magnitude of rotor-induced vibratory loads, the active vibration control system can improve the fatigue life of critical structural components, reduce vibration of avionics, reduce engine vibration, and improve passenger comfort.

FIG. 1 is an oblique view of a rotary-wing aircraft having an active vibration control system, which is described herein. Aircraft 11 is a rotary-wing aircraft, specifically a tiltrotor aircraft, having a fuselage 13 and wings 15 extending from fuselage 13. Fuselage 13 and wings 15 comprise the airframe of aircraft 11. A rotatable nacelle 17 is located at the outer end of each wing 15 for housing an engine (not shown), and each engine is configured for providing torque to cause rotation of an attached proprotor 19. Each proprotor 19 has a plurality of blades 21, which are connected to a hub (see FIG. 2) located beneath an aerodynamic fairing, referred to as a spinner 23.

Figure 2:
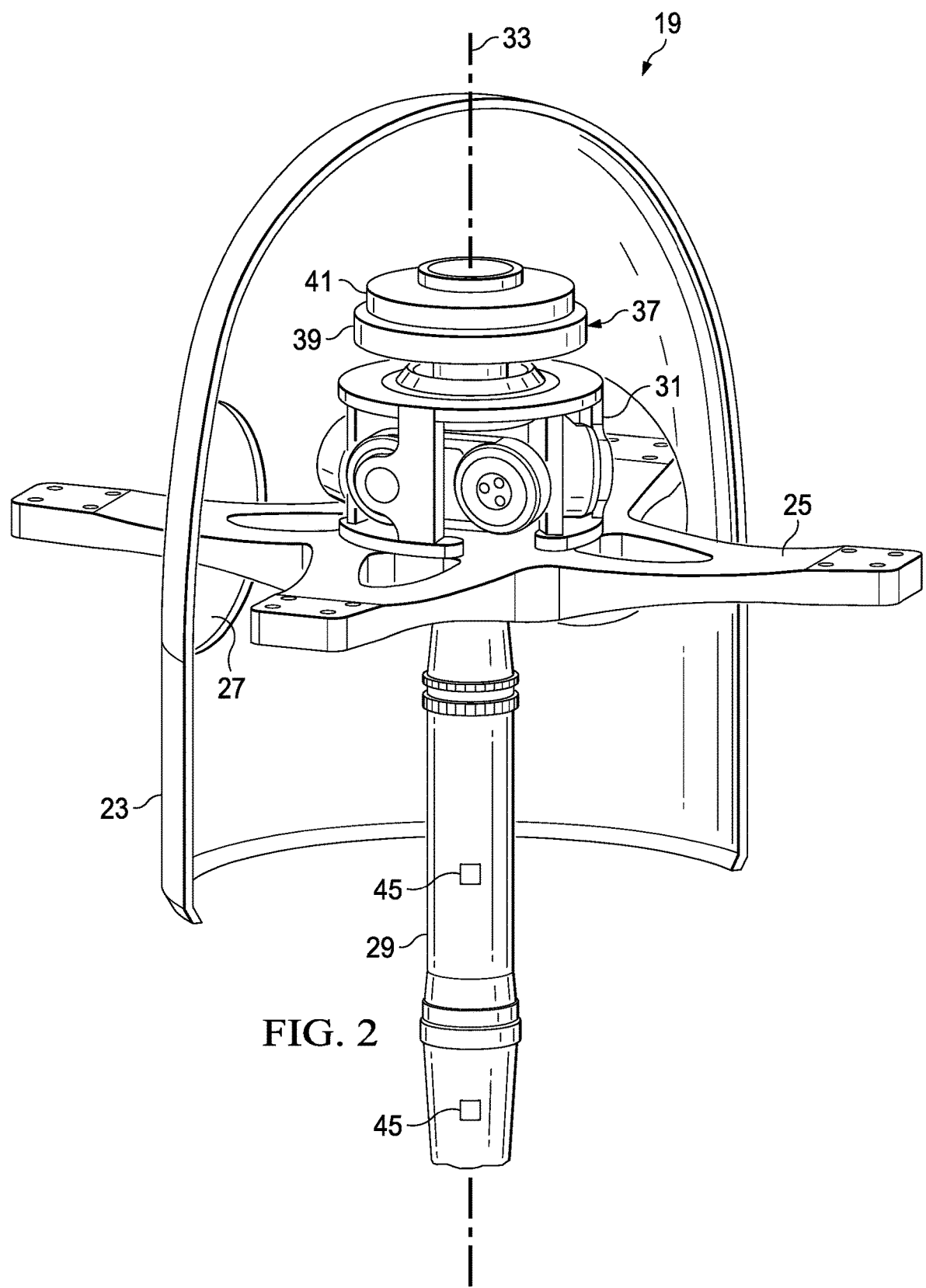
FIG. 2 is an oblique, partially sectioned view of a proprotor of the aircraft of FIG. 1, according to one example embodiment.

FIG. 2 is an oblique view of a proprotor 19 with blades 21 removed from yoke 25 of the hub. Holes 27 are formed in spinner 23 (a portion is cutaway for ease of viewing) for allowing portions of yoke 25 to protrude for attachment of blades 21. A mast 29 is connected to an output of the engine for transfer of torque from the engine to mast 29. In the configuration shown, a constant-velocity drive assembly 31 is splined to mast 29 for rotation with mast 29, and yoke 25 is connected to drive assembly 31. Drive assembly 31 allows for yoke 25 to gimbal relative to mast 29 as mast 29 drives yoke 25 in rotation about mast axis 33.

In the configuration shown, an active vibration control system 37 is carried on an end portion of mast 29. Active vibration control system 37 contains a force generator 39, and a microprocessor-based controller 41 to command the force generator 39. Force generator 39 and controller 41 are splined or otherwise affixed to mast 29 for rotation with mast 29. In the embodiment illustrated in FIG. 3, the force generator 39 contains at least two, and preferably four rotating unbalanced weights 50. The axis of rotation of each unbalanced weight 50 is non-concentric with mast axis 33, but is parallel to the mast axis 33 and offset from mast axis 33 a fixed radial distance. Unbalanced weights 50 are configured and commanded in pairs with each weight's axis of rotation symmetrically opposed about mast axis 33. Each unbalanced weight 50 has a center of mass that is located a radial distance from the axis of rotation for that particular weight 50, and driven in rotation about said axis. Each unbalanced weight 50 can be driven by a respective motor 52. In one embodiment, each motor 52 is an electric motor; however, in alternative embodiments motors 52 can be hydraulic or pneumatic, for example. Rotation of each unbalanced weight 50 about its particular axis and combined with rotation of the force generator 39 about mast axis 33 causes an oscillatory shear force on mast 29 in the plane of rotation. The amplitude of the force generator 39 shear force output is controlled by the rotational speed of the unbalanced weight 50, and indexing the positions of each unbalanced weight 50 relative to each other, while the phase of the shear force output is adjusted by equally indexing each unbalanced weight 50 relative to proprotor 19. The rotational speed of the unbalanced weights 50 is a multiple of the proprotor 19 rotational speed to create shear forces for canceling rotor induced vibrations, which can be rotating in the same direction as the proprotor 19 or in the opposite direction.

Referring also to FIGS. 1 and 2, controller 41 is located at the rotor hub in close proximity to the force generator 39 and is configured to automatically control the operation of the mast mounted force generator 39. Alternatively, the microprocessor-based controller 41 can be located in the fuselage 13, the wings 15, or the nacelles 17. Controller 41 preferably comprises feedback sensors, such as sensors 45 located on the rotor mast, on fuselage 13, on wings 15, and on nacelles 17 to provide vibration feedback data. Though shown in particular locations, sensors 45 may be installed in other locations. Use of sensors 45 allows controller 41 to control the operation of the mast mounted force generator 39 based on measurements of vibrations transmitted into and through the airframe. Controller 41 may alternatively control operation of force generator 39 based on other data, such as airspeed, rotor speed, blade pitch angle, nacelle angle, amount of rotor thrust, and/or similar aircraft parameters.

Operational control of force generator 39 preferably includes commanding at least rotational speed, rotational direction, and indexing of the unbalanced weights 50, and phasing of the unbalanced weights 50 relative to proprotor 19. Controller 41 and force generator 39 may be provided with "fail-off" features to prevent active vibration control system 37 from inducing unintended and undesirable vibrations in the event of failure of one or more components of the system. Inputs to controller 41 may include aircraft gross weight, load factor, altitude, airspeed, and rotor speed (RPM). In addition, controller 41 may be optimized for use on tiltrotor aircraft 11 by also basing commands on the angle of nacelles 17 and other tiltrotor-specific parameters.

Controller 41 independently commands each unbalanced weight 50 to be driven in the selected rotational direction and at the selected rotational speed. For example, the unbalanced weights 50 may be driven in the same rotational direction as mast 29 and at a multiple of the rotational speed of mast 29. The unbalanced weights 50 create oscillatory shear forces in the plane of rotation at a frequency described as the number of cycles per revolution of proprotor 19 (n/rev). When the shear forces are equal in amplitude to the aerodynamic n/rev forces of proprotor 19 and opposite their phase, then no vibratory force will be transmitted to the airframe. For example, if a four-blade proprotor 19 is rotating at 400 revolutions per minute, and the force generator 39 is to oppose 4/rev vibrations by rotating unbalanced weights 50 in the direction of proprotor 19, controller 41 will cause the weights to spin at 4× the speed of proprotor 19 relative to the airframe. Because mast 29 is spinning in the same direction as force generator 39 relative to the airframe at 1× the speed of proprotor 19, the weights 50 will be spinning at 3× the speed of proprotor 19 relative to mast 29 and proprotor 19. Likewise, if force generator 39 is to oppose 8/rev vibrations by rotating unbalanced weights in the opposite rotation of proprotor 19, controller 41 will cause the weights 50 to spin at 8× the speed of proprotor 19 relative to the airframe. Because mast 29 and force generator 39 are spinning in the same direction at 1× the speed of proprotor 19, the unbalanced weights 50 will be spinning in the opposite direction at 9× the speed of proprotor 19 relative to mast 29 and proprotor 19.

Figure 3:
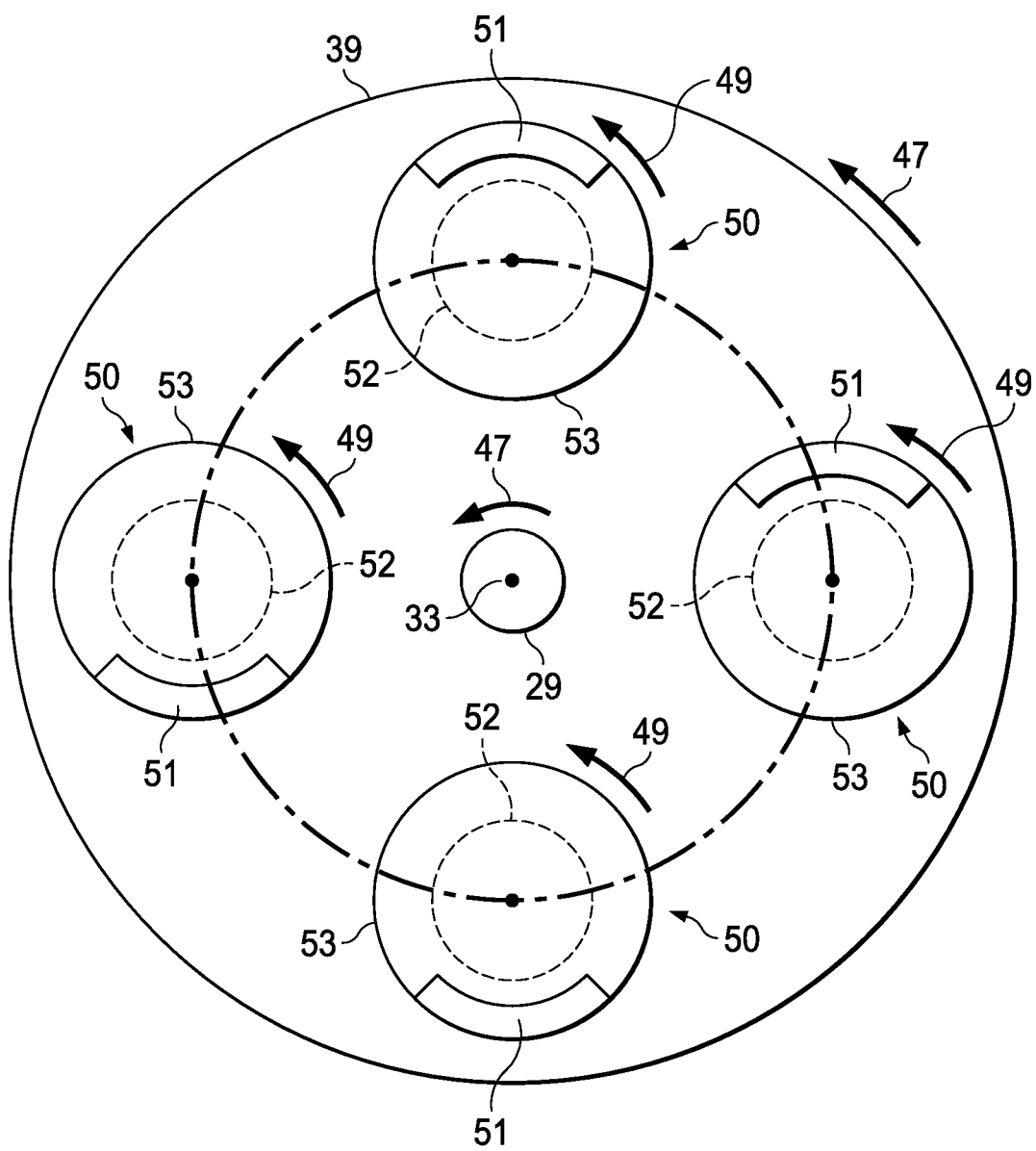
FIG. 3 is a schematic top view of a portion of the active vibration control system of the aircraft of FIG. 1, according to one example embodiment.
Figure 4:
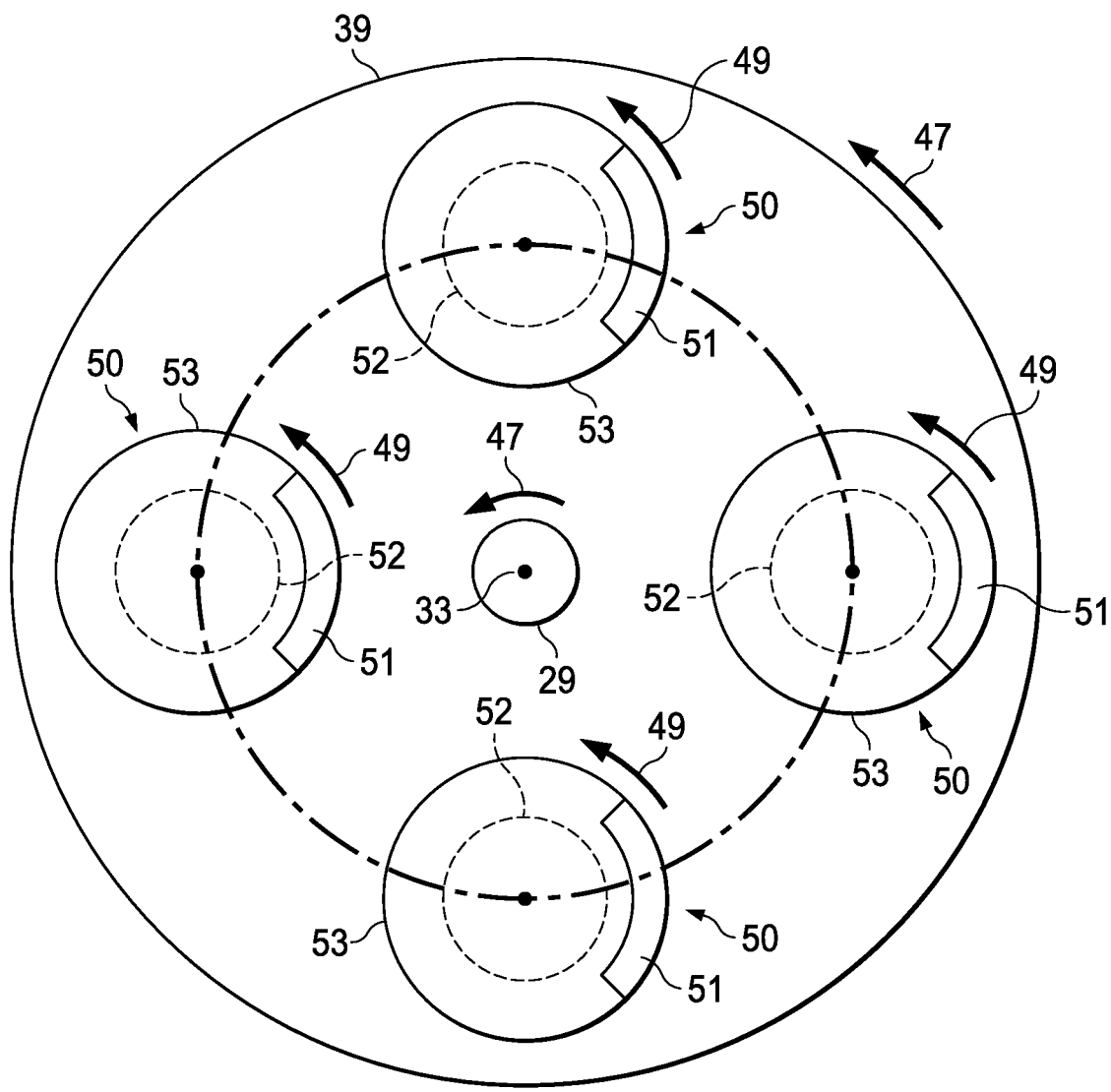
FIG. 4 is a schematic top view of a portion of the active vibration control system of the aircraft of FIG. 1, according to one example embodiment.
Figure 5:
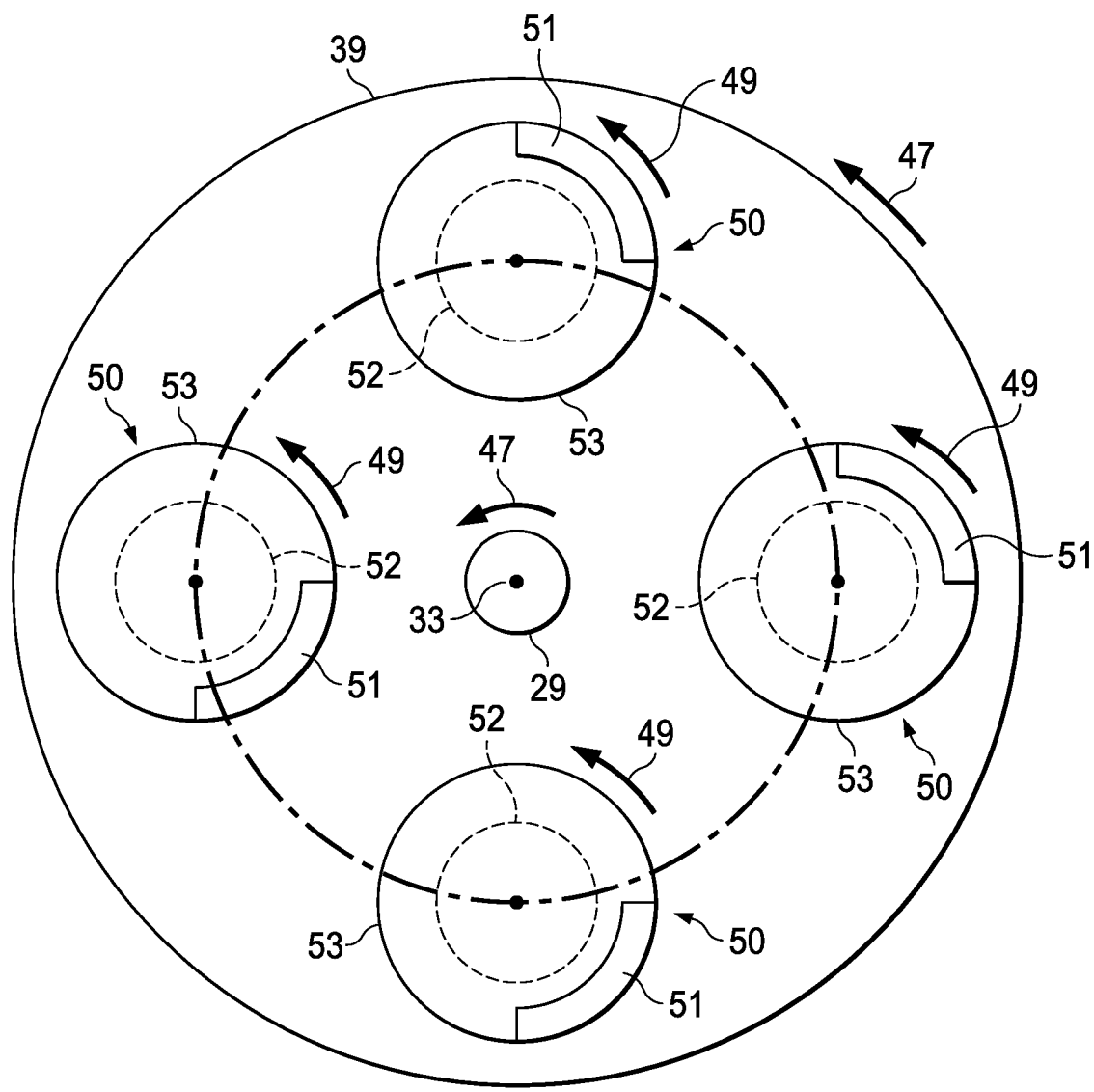
FIG. 5 is a schematic top view of a portion of the active vibration control system of the aircraft of FIG. 1, according to one example embodiment.

The magnitude of the total oscillatory shear force produced by force generator 39 is determined by the relative position of the center of mass of each unbalanced weight 50. FIGS. 3, 4, and 5 illustrate the relative rotational positions of each unbalanced weight 50 of force generator 39 for three modes of operation, with each figure viewed along mast axis 33. In each figure, the direction of rotation of mast 29 is shown by arrow 47, and the direction of rotation of each unbalanced weight 50 is shown by arrow 49.

As described above, each unbalanced weight 50 has a center of mass located a radial distance from its axis of rotation, and this may be accomplished, for example, by locating a mass 51 along a peripheral portion of a disk 53. Mass 51 may be formed as an integral portion of disk 53 or may be formed as a separate component and attached to disk 53. To provide for additional tuning of force generator 39, each mass 51 may be configured to be replaceable, for example, by a similarly constructed mass 51 having more or less mass. Mass 51 may also be constructed of multiple pieces, allowing mass 51 to be adjusted by removing or adding pieces. Though shown as having only one mass 51, it should be understood that disks 53 may configured to have more than mass 51. Alternatively, mass 51 may be adapted to the axis of rotation by one or more arms extending from the axis of rotation.

If masses 51 of force generator 39 are diametrically opposed, as shown in FIG. 3, while disks 53 are driven in rotation at the same speed, then the amplitude of the vibratory force will be zero. This is due to the fact that each disk 53 causes an equal and opposite shear force that cancels the force caused by the diametrically opposed disk of force generator 39. If disks 53 are indexed during rotation so that masses 51 are aligned, as shown in FIG. 4, the total shear force is the maximum magnitude that force generator 39 can produce for any given rotational speed. Any magnitude between zero and the maximum is available by changing the relative rotational positions of disks 53, and FIG. 5 shows disks 53 as having been indexed at an angle of approximately 45 degrees relative to the index positions of FIG. 3.

Proprotor 19 is described as having only one force generator 39, though additional force generators may be added to oppose additional vibration modes (8/rev, 12/rev, etc.). Additional force generators are added in a coaxial arrangement along mast axis 33, and each force generator may comprise weights having a different weight than disks 53 and operating at a selected rotational speed different than disks 53. It should be noted that the force generators will be different for different types of rotors, as the weights and axes of rotation will be optimized for the particular application.

Another feature of the active vibration control system described above is the capability to provide some vibration attenuation when the controller 41 is not commanding the unbalanced weights to be driven in rotation. If the unbalanced weights are not driven in rotation, the weights will freely respond to rotor hub motions in a manner analogous to a simple pendulum absorber response. The dynamic response of the non-driven unbalanced weights creates oscillatory shear forces at the rotor hub for reduction of rotor induced vibrations. This feature of the active vibration control system provides a fail-safe mode of operation in the event a component or system failure prevents the unbalanced weights 50 from being driven in a prescribed manner.

Another feature of the active vibration control system described above is the absence of a 1/rev mast load when the controller 41 is not commanding the unbalanced weights 50 to be driven in rotation. If the unbalanced weights 50 are not driven in rotation, the weights 50 will be forced to a steady position by the centrifugal force caused by the 1/rev rotation of the force generator 39. In this position the center of mass of each weight 50 will be at the same radial distance from the mast axis 33. Since the weights 50 are symmetrically positioned within force generator 39, the total center of mass of force generator 39 will be coincident with the mast axis, and a 1/rev mast load will not be created.

Other embodiments of the active vibration control system force generator 39 described above may include a gear-type drive system for driving the unbalanced weights in rotation rather than using electric, hydraulic, or pneumatic motors. This type of force generator would operate without requiring a large external source of power, as the power required for operation is preferably taken from the mast. Motors 52 would then be small electric motors or clutches to position and index the unbalanced weights relative to each other and relative to the proprotor for phasing, but once indexed and phased; the parasitic power requirement is negligible and is derived from the mast torque.

Figure 6:
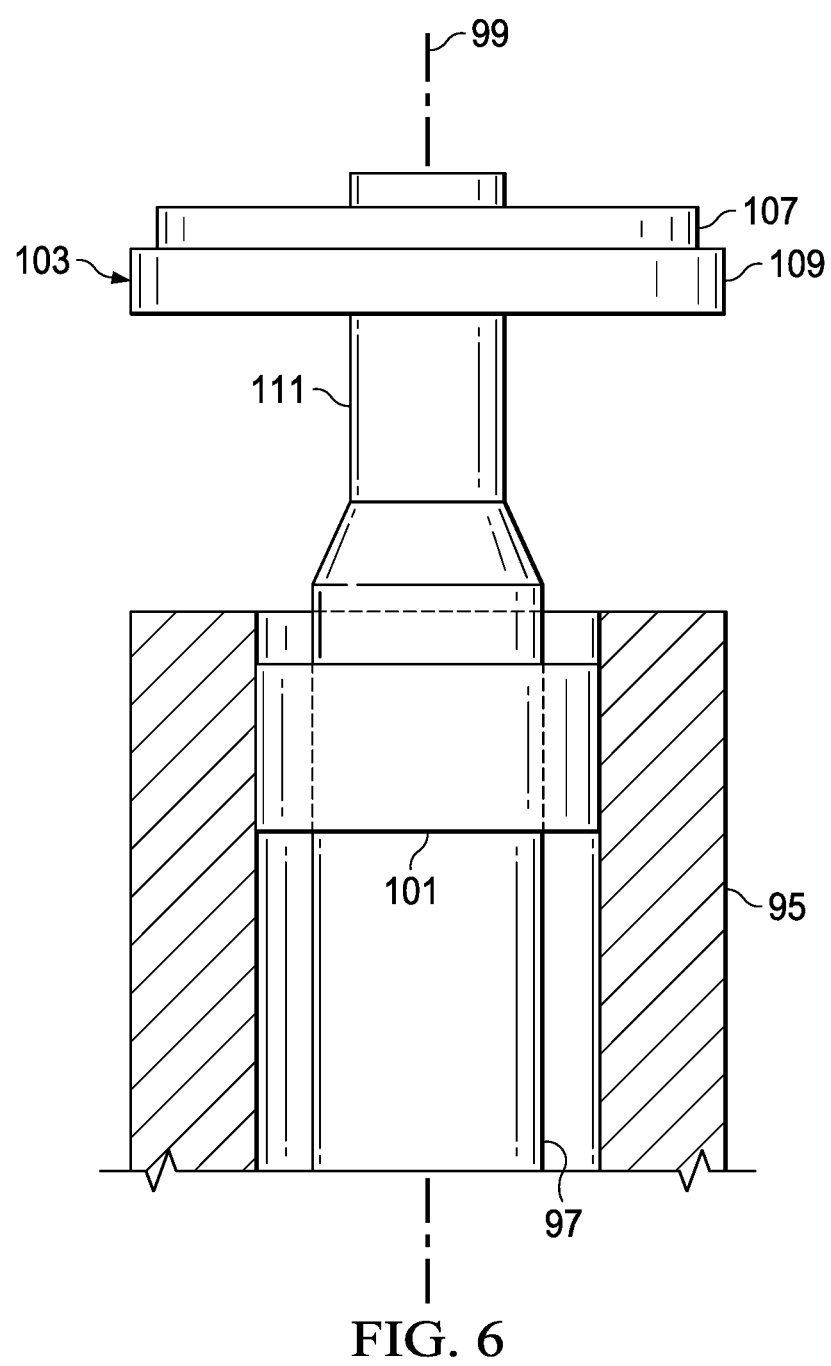
FIG. 6 is a schematic side view of a portion of the active vibration control system mounted to a standpipe that is enclosed by and coaxial with a rotor mast, according to another example embodiment.

Another feature that may be incorporated in the active vibration control system described above is a "standpipe" configuration for mounting of the force generator. FIG. 6 shows an example embodiment, in which a mast 95 encloses a coaxial standpipe 97. In FIG. 6, mast 95 is shown with a portion removed for ease of viewing standpipe 97. Mast 95 rotates relative to the airframe (not shown) about axis 99 for rotating an attached proprotor (not shown). Standpipe 97 is stationary relative to the airframe, and bearings 101 are located between an outer surface of standpipe 97 and an inner surface of mast 95 to allow for the relative motion of mast 95 relative to standpipe 97. In the embodiment shown, a force generator 109 and controller 107 are mounted to a narrowed section 111 at an outer end of standpipe 97. In operation, motors 52 rotate the unbalanced weights within force generator 109 in a similar manner as those described above, allowing force generator 109 to produce oscillatory shear forces on standpipe 97. These shear forces are then transferred into mast 95 through bearings 101. It should be noted that more force generators than is shown may be mounted on standpipe 97. It should also be noted that a standpipe configuration is particularly useful with the gear-type drive system described above.

Figure 7:
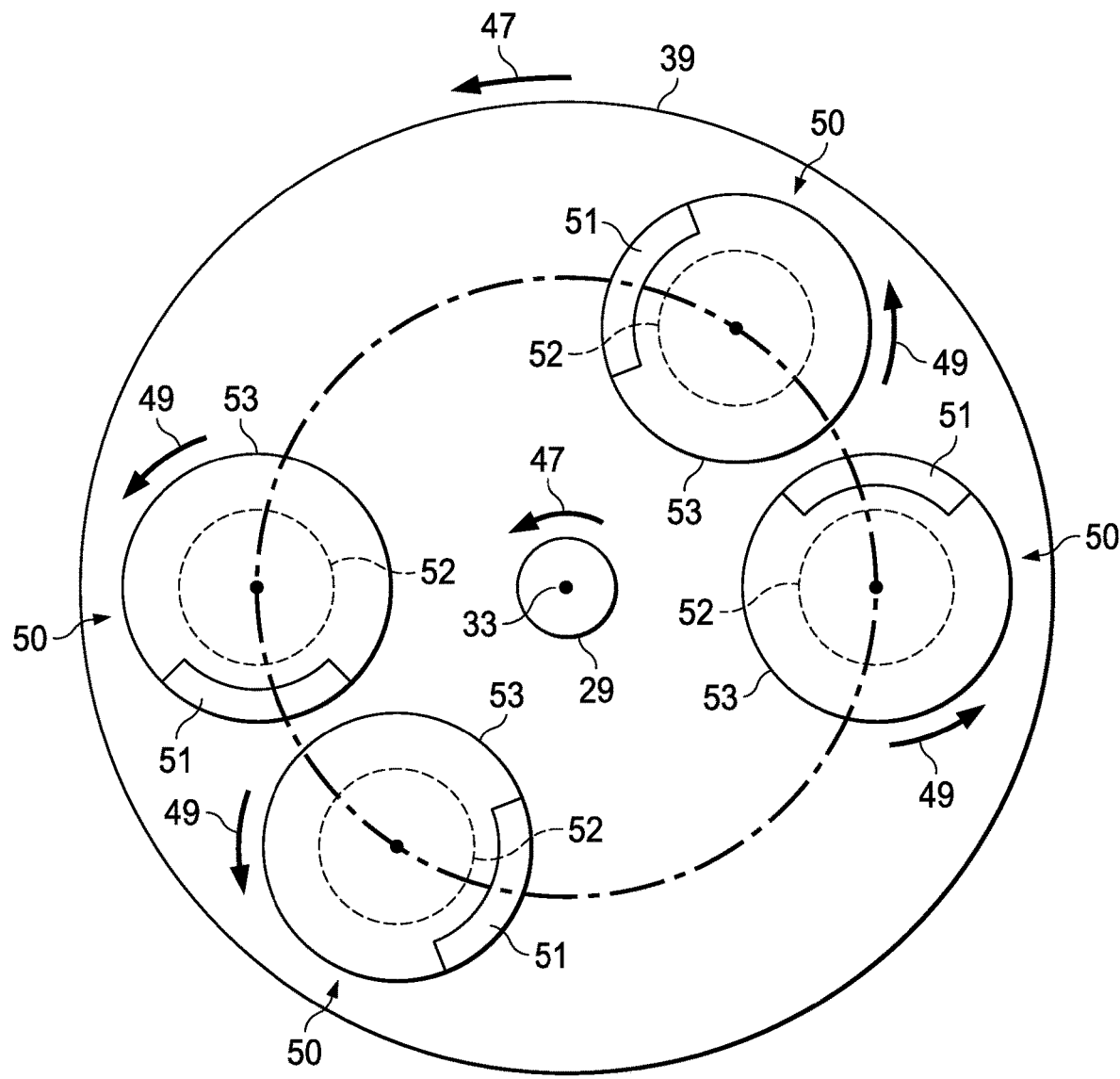
FIG. 7 is a schematic top view of a portion of the active vibration control system, according to another example embodiment.

Another example embodiment of the active vibration control system force generator 39 is illustrated in FIG. 7. Force generator 39 can contain at least one pair, and preferably two pair of rotating unbalanced weights 50. The axis of rotation of each unbalanced weight 50 is non-concentric with mast axis 33, but is parallel to the mast axis 33 and offset from mast axis 33 a fixed radial distance. Unbalanced weights 50 are configured and commanded in pairs with the axis of rotation of each unbalanced weight 50 in a pair being diametrically opposed about mast axis 33. Any number of pairs of unbalanced weights 50 can be utilized as long as the axis of rotation for each unbalanced weight 50 is offset from mast axis 33 the same radial distance, and the axes of rotation for each unbalanced weight 50 in a pair are diametrically opposed about mast axis 33. The relative position of one pair of unbalanced weights 50 to another pair of unbalanced weights 50 is not constrained to a particular relationship, as long as the axis of rotation for each unbalanced weight 50 is offset from mast axis 33 the same radial distance, and the axes of rotation for each unbalanced weight 50 in a pair are diametrically opposed about mast axis 33. Operational control of force generator 39 is similar to the methods further described herein.

Figure 8:
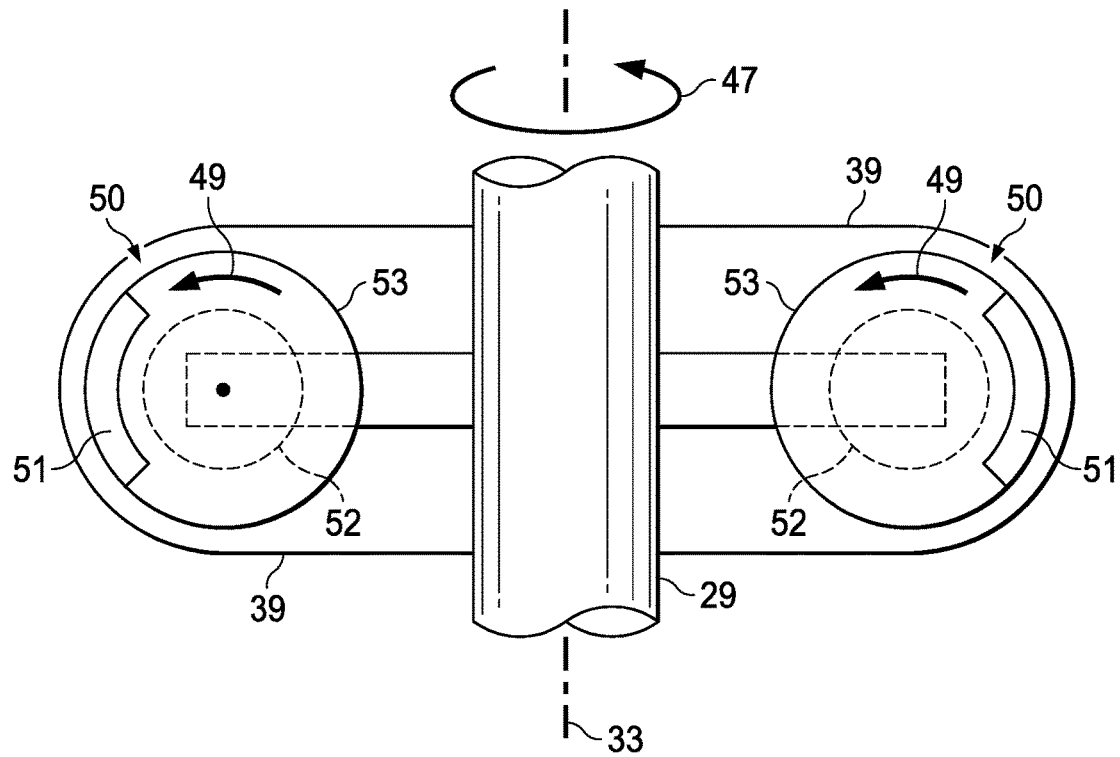
FIG. 8 is a schematic side view of a portion of the active vibration control system, according to another example embodiment.

Another example embodiment of the active vibration control system force generator 39 is illustrated in FIG. 8. Force generator 39 can contain at least one pair, and preferably two pair of rotating unbalanced weights 50, but only one pair of unbalanced weights 50 is shown for clarity. The axis of rotation of each unbalanced weight 50 is normal to mast axis 33 and offset from mast axis 33 a fixed radial distance. Unbalanced weights 50 are configured and commanded in pairs with each weight's axis of rotation symmetrically opposed about mast axis 33. Each unbalanced weight 50 has a center of mass that is located a radial distance from the axis of rotation for that particular unbalanced weight 50, and driven in rotation about said axis. Rotation of each unbalanced weight 50 about its particular axis and combined with rotation of the force generator 39 about mast axis 33 causes an oscillatory shear force on mast 29. Operational control of force generator 39 is similar to the methods further described herein.

Figure 9:
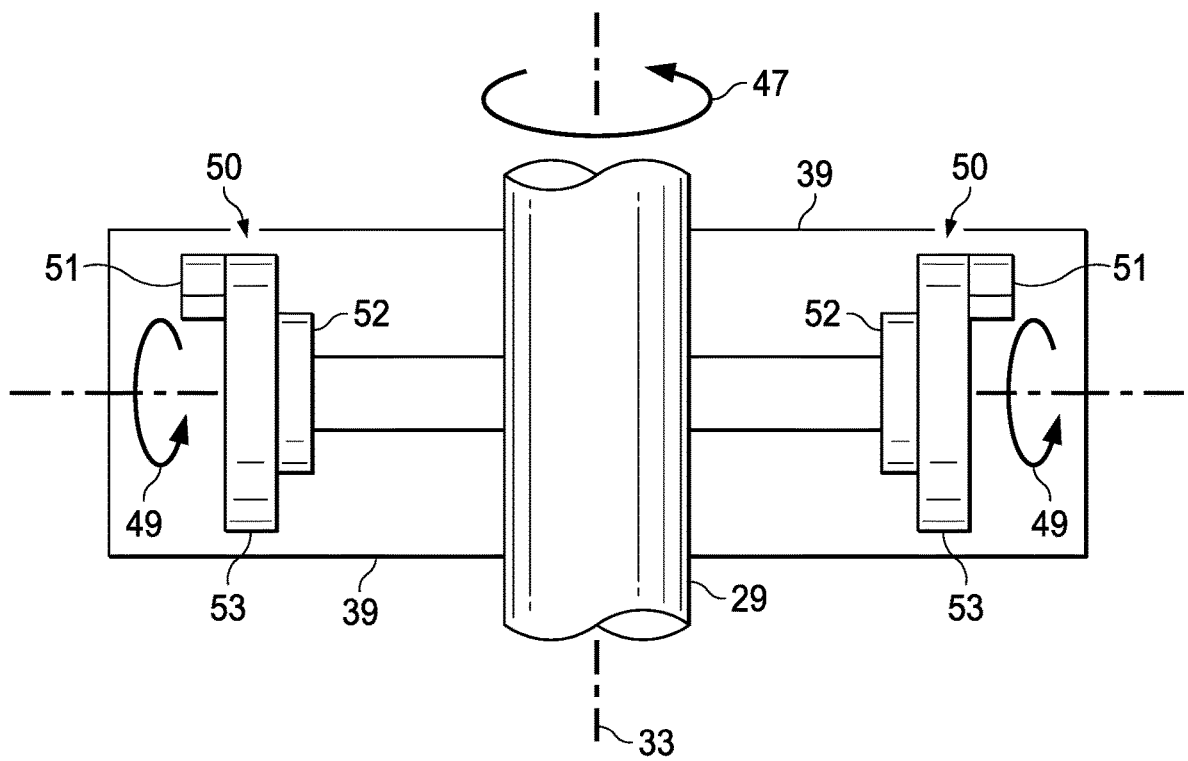
FIG. 9 is a schematic side view of a portion of the active vibration control system, according to another example embodiment.

Another example embodiment of the active vibration control system force generator 39 is illustrated in FIG. 9. Force generator 39 contains at least one pair, and preferably two pair of rotating unbalanced weights 50, but only one pair of unbalanced weights 50 is shown for clarity. The axis of rotation of each unbalanced weight 50 is normal to mast axis 33 and the axis projection intersects mast axis 33. Unbalanced weights 50 are offset from mast axis 33 a fixed radial distance. Unbalanced weights 50 are configured and commanded in pairs with each weight having a common axis of rotation. Each unbalanced weight 50 has a center of mass that is located a radial distance from the axis of rotation for that particular unbalanced weight 50, and driven in rotation about said axis. Rotation of each unbalanced weight 50 about its particular axis and combined with rotation of the force generator 39 about mast axis 33 causes an oscillatory shear force on mast 29. Operational control of force generator 39 is similar to the methods further described herein.

The active vibration control system described above provides for several advantages, including: (1) improved capability of vibration attenuation; (2) attenuation of vibration at the mast before transmission to the airframe; (3) passive vibration attenuation if the unbalanced weights are not driven in rotation; (4) reduced weight; and (5) improved reliability.

This description includes reference to illustrative embodiments, but it is not intended to be construed in a limiting sense. Various modifications and combinations of the illustrative embodiments, as well as other embodiments, will be apparent to persons skilled in the art upon reference to the description. For example, embodiments of active vibration control systems are shown installed on four-blade tiltrotor proprotors, though embodiments of active vibration control systems may be used on a tiltrotor proprotor having any number of blades and any other type of rotor, such as a helicopter rotor or aircraft propeller.

Embodiments of the active vibration control system can include one or more computer systems having hardware and software for performing one or more tasks described herein. This can include, for example, a computer having one or more processing units and non-volatile memories that store non-transitory software instructions for instructing the processing units to perform at least some of the tasks described herein. Further, the software described herein is non-transitory.

The particular embodiments disclosed above are illustrative only, as the system may be modified and practiced in different but equivalent manners apparent to those skilled in the art having the benefit of the teachings herein. Modifications, additions, or omissions may be made to the apparatuses described herein without departing from the scope of the invention. The components of the system may be integrated or separated. Moreover, the operations of the system may be performed by more, fewer, or other components.

Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

The invention claimed is:

1. An active vibration control system for a proprotor of an aircraft, the proprotor including a plurality of blades connected to a rotor hub rotated by a mast about a mast axis of rotation, the active vibration control system comprising:
   a force generator attached to the mast for rotation with the mast, the force generator comprising:
   (a) a first motor;
   (b) a second motor;
   (c) a first weight configured to be independently driven about a first axis of rotation by the first motor, the first weight disposed on a first arm extending away from the mast;
   (d) a second weight configured to be independently driven about a second axis of rotation by the second motor, the second weight disposed on a second arm extending away from the mast;
   (e) a third weight independently driven about a third axis of rotation by a third motor and being diametrically opposed to the first weight; and
   (f) a fourth weight independently driven about a fourth axis of rotation by a fourth motor and being diametrically opposed to the second weight;
   wherein the first weight and the third weight form a first set, and the second weight and the fourth weight form a second set; and wherein the first axis of rotation and the second axis of rotation are non-concentric and parallel to the mast axis of rotation;
a controller for receiving input signals and outputting command signals that are at least dependent on a rotational speed of the proprotor independently to the first motor, the second motor, the third motor, and the fourth motor to control a generated oscillatory shear force of the force generator; and
a sensor for measuring vibration and providing input to the controller;
wherein during operation the first set is rotated about the mast axis of rotation at a different rotational speed than the second set, allowing the generated oscillatory shear force of the force generator to attenuate vibrations at multiple frequencies;
wherein during operation the first set is rotated about the mast axis of rotation in an opposite rotational direction than the second set;
wherein the axis of rotation for each of the first weight, the second weight, the third weight, and the fourth weight are offset from the mast axis a same radial distance; and
wherein a first relative position of the first weight and the third weight in the first set and a second relative position of the second weight and the fourth weight of the second set have zero additional positional relationship constraints other than being the same radial distance from the mast axis and being diametrically opposed from one another.

2. The active vibration control system according to claim 1, wherein during operation the first weight about the first axis of rotation and the second weight about the second axis of rotation share a same rotational direction as the mast about the mast axis of rotation.

3. The active vibration control system according to claim 1, wherein the third axis of rotation and the fourth axis of rotation are non-concentric and parallel to the mast axis of rotation, and during operation the third weight about the third axis of rotation and the fourth weight about the fourth axis of rotation share a same rotational direction as the mast about the mast axis of rotation.

* * * * *